(12) United States Patent
Schwarz (10) Patent No.: US 10,329,673 B2
(45) Date of Patent: Jun. 25, 2019

(54) GALVANIC ANODE SYSTEM FOR THE CORROSION PROTECTION OF STEEL IN CONCRETE

(71) Applicants: Wolfgang Schwarz, Vienna (AT); SIKA TECHNOLOGY AG, Baar (CH)

(72) Inventor: Wolfgang Schwarz, Vienna (AT)

(73) Assignee: SIKA TECHNOLOGY AG, Baar (CH)

(*) Notice: Subject to any disclaimer, the term of this patent is extended or adjusted under 35 U.S.C. 154(b) by 152 days.

(21) Appl. No.: 15/322,308

(22) PCT Filed: Jun. 29, 2015

(86) PCT No.: PCT/EP2015/064721
§ 371 (c)(1),
(2) Date: Dec. 27, 2016

(87) PCT Pub. No.: WO2015/197870
PCT Pub. Date: Dec. 30, 2015

(65) Prior Publication Data
US 2017/0137948 A1 May 18, 2017

(30) Foreign Application Priority Data
Jun. 27, 2014 (AT) ..................................... 512/2014

(51) Int. Cl.
*C23F 13/16* (2006.01)
*C23F 13/06* (2006.01)
(Continued)

(52) U.S. Cl.
CPC .............. *C23F 13/16* (2013.01); *C04B 41/50* (2013.01); *C23F 13/06* (2013.01); *C23F 13/08* (2013.01);
(Continued)

(58) Field of Classification Search
CPC .......... C23F 13/02; C23F 13/06; C23F 13/08; C23F 13/10; C23F 13/12–13/14; C23F 13/16; C23F 2201/02; C23F 2213/22
See application file for complete search history.

(56) References Cited

U.S. PATENT DOCUMENTS 4,506,485 A   3/1985   Apostolos
5,423,961 A   6/1995   Bennett et al.
(Continued)

FOREIGN PATENT DOCUMENTS

AT      413822 B     6/2006
CN     1423844 A     6/2003
(Continued)

OTHER PUBLICATIONS

Aug. 14, 2015 International Search Report issued in International Patent Application No. PCT/EP2015/064721.
(Continued)

*Primary Examiner* — Alexander W Keeling
(74) *Attorney, Agent, or Firm* — Oliff PLC (57) ABSTRACT

A galvanic anode system for the corrosion protection of steel in concrete includes a galvanic anode material, which includes of zinc and alloys thereof, embedded in a solid electrolyte, and is characterized in that the galvanically available surface is larger, preferably at least twice as large, as the total geometrical surface of the metal anode. The galvanic anode system is also characterized in that, during operation, during which the anode disintegrates as a sacrificial anode, the galvanically active anode surface is reduced only slightly, preferably is not reduced up to at least 50%, in particular 75%, of the time during use.

14 Claims, 2 Drawing Sheets

(51) Int. Cl.
*C23F 13/08* (2006.01)
*C23F 13/10* (2006.01)
*C04B 41/50* (2006.01)
*C04B 111/26* (2006.01)

(52) U.S. Cl.
CPC .......... *C23F 13/10* (2013.01); *C04B 2111/26* (2013.01); *C04B 2111/265* (2013.01); *C23F 2201/02* (2013.01)

(56) References Cited

U.S. PATENT DOCUMENTS

| | | | |
|---|---|---|---|
| 5,714,045 | A | 2/1998 | Lasa et al. |
| 5,968,339 | A | 10/1999 | Clear |
| 6,022,469 | A * | 2/2000 | Page ................ C23F 13/02 204/196.1 |
| 6,193,857 | B1 | 2/2001 | Davison et al. |
| 6,303,017 | B1 | 10/2001 | Page et al. |
| 6,569,296 | B1 | 5/2003 | Burgher et al. |
| 8,361,286 | B1 * | 1/2013 | Giorgini ............ C23F 13/06 204/196.1 |
| 8,394,193 | B2 | 3/2013 | Schwarz |
| 2005/0077191 | A1 * | 4/2005 | Whitmore ............ C23F 13/16 205/734 |
| 2007/0209949 | A1 | 9/2007 | Whitmore |
| 2012/0152732 | A1 * | 6/2012 | Tarrant ............ C23F 13/10 204/196.3 |

FOREIGN PATENT DOCUMENTS

| | | |
|---|---|---|
| EP | 0668373 B1 | 8/1999 |
| EP | 1068164 B1 | 9/2002 |
| EP | 1318247 A1 | 6/2003 |
| EP | 1135538 B1 | 10/2003 |
| EP | 2313352 B1 | 10/2014 |
| WO | 2006/012660 A3 | 11/2006 |
| WO | 2011/031494 A2 | 3/2011 |

OTHER PUBLICATIONS

Mar. 28, 2017 Office Action issued in Colombian Ref. File No. NC2017/0000620.
Aug. 2, 2018 Office Action issued in Chinese Patent Application No. 201580034823.9.
Sep. 10, 2018 Office Action issued in Colombian Patent Application No. NC2017/0000620.
Mar. 5, 2019 Office Action issued in European Patent Application No. 15732676.0.
Mar. 6, 2019 Office Action issued in Chinese Patent Application No. 201580034823.9.
Feb. 13, 2019 Office Action issued in Australian Patent Application No. 2015279056.

* cited by examiner

Figure 2

Figure 3

GALVANIC ANODE SYSTEM FOR THE CORROSION PROTECTION OF STEEL IN CONCRETE

The invention relates to a galvanic anode system for corrosion protection of steel in concrete. The galvanic anode system of the invention consists of a galvanic metallic anode material which has been embedded into a solid electrolyte, consists of zinc and alloys thereof, and is characterized in that the galvanically available surface area is greater than the geometric total surface area of the metal anode. In the galvanic anode system of the invention, the galvanically available surface area is not less than the galvanically active surface area, the galvanically active surface area being characterized in that it is available for the galvanic protection of the steel reinforcement. The galvanic anode system of the invention is further characterized in that, during operation, during which the anode dissolves as a sacrificial anode, the galvanically active anode surface area (i.e. the galvanically active surface area of the metal anode) decreases only slightly, preferably not at all, preferably up to at least 50%, especially up to 75%, of the useful life.

Corrosion of steel reinforcement is one of the most significant causes of elevated maintenance and repair costs and, subsequently, of the shortening of the useful life of steel-reinforced concrete structures. Corrosion of the steel reinforcement is caused by the penetration of chlorides into the concrete covering and/or by carbonation of the concrete covering. Components of civil engineering structures, for example bridges, tunnels etc., and parking garages, which are frequently exposed to defrosting salt, and structures that are exposed to sea salt, for example harbor installations, bridges, apartments close to the sea, are endangered and affected by chloride-induced corrosion of the steel reinforcement, caused by chlorides penetrating into the concrete. In such components, in the event of damage, the chloride-contaminated concrete has to be removed down to beyond the steel reinforcement and replaced by new fresh concrete or repair mortar. However, this method of repair is very complex, labor-intensive and costly. An alternative to conventional repair of built structures endangered by the corrosion of the steel reinforcement which has already been established for about 30 years is cathodic corrosion protection (CCP), as described, for example, in EP1068164B1. An alternative and/or supplementary measure to CCP which is also used as is galvanic corrosion protection (GCP), as described, for example, in AT 1344/2004, EP1135538, EP0668373 and in U.S. Pat. No. 4,506,485. The effect of GCP is based on the formation of a galvanic element between a sacrificial anode and the steel reinforcement, with the concrete acting as electrolyte. The anode materials used are typically zinc and alloys thereof, and less commonly aluminum and alloys thereof. The anode is typically installed either on the concrete surface or in holes drilled in the component to be protected. For avoidance of "incipient anodes", in the case of conventional repairs to concrete-contaminated components in the interface region between repair mortar and old concrete, prefabricated galvanic anodes are secured to the reinforcement and embedded in repair mortar. Such a galvanic anode system is described, for example, in U.S. Pat. Nos. 6,022,469, 6,303,017, 6,193,857.

The protection of the steel reinforcement from corrosion, especially in chloride-contaminated concrete, by galvanic anodes is effected through flow of electrons from the metal anode having a more negative half-cell potential to the corroding steel. For example, the half-cell potential of $Zn/Zn^{2+}$ is $-0.763$ V versus the normal hydrogen electrode (NHE), and that of iron $Fe/Fe^{2+}$ is $-0.440$ V versus NHE. For every two electrons that flow from the zinc anode to the steel, one zinc atom goes into solution; oxygen dissolved in the pore solution is reduced at the reinforcement steel.

If zinc is used as metal for the galvanic anode, the mode of function corresponds to a zinc-air battery with a maximum cell voltage of 1.6 volts.

$$2Zn+O_2+2H_2O \rightarrow 2Zn(OH)_2 (\Delta U=1.6\ V)$$

In practice, the cell voltage ("open-circuit potential—OCP") is between 0.4 and 1.0 volt.

The principle of galvanic protection is thus based on corrosion and consumption of the galvanic zinc anode rather than the steel reinforcement.

The useful life of such galvanic anodes necessarily depends on the amount of metal anode available, on the current flow to the reinforcement steel and on the self-corrosion of the anode.

Given a known mass of the metal anode available for galvanic protection and the current flow (amount of electrons released in coulombs), it is possible to estimate the useful life of the galvanic anode. It is typically in the range of 10-25 years.

In order to assure reliable, lasting and full protection of the steel reinforcement, sufficient electrical current has to flow between the galvanic anode and the steel reinforcement. Galvanic corrosion protection exists to a sufficient degree when there is no longer any flow of corrosion current. This can be verified by macro cell current measurements. In practice, what is called a 100 mV depolarization criterion, based purely on values from experience, has been found to be useful, as described, for example, in the ISO EN 12 696 (2012) standard.

The current flow between the galvanic anode and the reinforcement steel to be protected depends, among other factors, very significantly on the active surface area of the galvanic anode: as is commonly known, the current flow is roughly proportional to the surface area of the anode. As a function of the geometry of the galvanic anode, the galvanically active surface area of the anode decreases as a result.

For example, the current flow in the case of a cylindrical anode (diameter 5 cm, length 10 cm) after 50% consumption, after 67% consumption and after 75% consumption is still 45% of the initial surface area. In the case of a square anode (diameter 12.5 cm, height 1 cm) after 50% consumption, after 70% consumption and after 75% consumption still 50% of the initial surface area.

In the case of anodes in the form of sheets, as also used in practice, the galvanically active surface area decreases even more rapidly during operation compared to the material consumption (i.e. surface area in relation to the volume), and even more rapidly in the case of cylindrical sheets than in the case of square sheets.

Also often used in practice are galvanic anodes whose surface area is increased by engraving grooves into a cylinder, for example star-shaped grooves. However, it is only on commencement of operation that this brings about an increased surface area in relation to the volume and hence an increased current flow to the steel reinforcement to be protected. Since the peaks of the grooves are more exposed to the electrical field that forms between the galvanic anode and the steel reinforcement to be protected than the "valleys" of the grooves, the anode material of the groove tips is consumed preferentially during operation, and so the grooves are worn away after a relatively short period of operation and only a cylindrical or prismatic anode is present.

This has the consequence that, during the operation of the galvanic anodes, the active surface area and hence the current flow to the reinforcement steel surface to be protected decrease continuously and, consequently, the protective effect of the galvanic anode decreases significantly. The effect of this can be that, for example, after 50% consumption of the galvanic anode, the steel is no longer sufficiently protected from corrosion.

During the operation of the galvanic anode, anode material is consumed and anodic reaction products form at the anode surface. For example, during the operation of a galvanic zinc anode, zinc hydroxide forms at the interface to the concrete, and this can lead to hindrance of current flow as a result of the increase in electrolytic resistance and hence to a further decrease in current flow and thus to a further reduction in the protective effect.

The smaller the ratio of active surface area to the volume of the galvanic anode, the more rapid the decrease in the active surface area in relation to the volume, as can easily be shown mathematically.

Furthermore, there is also an increase in the detrimental effect of the deposition of anodically formed products, for example zinc hydroxide.

Both processes, the decrease in the galvanically active surface area and the increase in the deposition of anodic reaction products, even in the medium term, can lead to failure of the protective effect of galvanic anodes.

It was therefore an object of the present invention to design and produce a galvanic anode in which the galvanically active surface area is sufficiently high that, even after 75% consumption of the anode, sufficient galvanically active surface area is available to assure reliable corrosion protection of the steel reinforcement. Preferably, however, a galvanic anode is to be designed and produced, in which the galvanically active surface area decreases only slightly and preferably virtually not at all during operation, and hence enables sufficient current flow to the reinforcement steel to be protected in a lasting manner.

The objective was achieved as follows:

The galvanically active surface area, the decrease therein during the consumption of the galvanic anode and the surface/volume ratio naturally depend on the dimensions of the galvanic anode.

For instance, a cylindrical anode (diameter 2.58 cm, length 8 cm) has a galvanically active surface area of 76 cm$^2$ and a volume of 42 cm$^3$ (corresponding to a weight of zinc of 300 g) with an S/V ratio of 1.80. As already stated above, only 47% or 35 cm$^2$ of the surface area is available after 75% consumption. In general, a radius of action of a galvanic anode of about 20 cm is assumed; the person skilled in the art is aware from practical experience that a protection current of at least 3 mA/m$^2$ of reinforcement steel is required for reliable corrosion protection. In most components, the ratio of concrete surface area/surface area of the steel reinforcement is about 1. In invitations to tender, a minimum current density of 10 mA/m$^2$ or more is being required, but it is known from practical experience that such a high current density is only required at the start; after only a few months, the current requirement falls to about 3-5 mA/m$^2$. It can of course be much higher in moist components.

Assuming a minimum current requirement of 3 mA/m$^2$, a current requirement of 0.38 mA is found for a surface area of action of 0.12 m$^2$ that arises from the radius of action. The above-cited galvanic anode, given an initial surface area of 76 cm$^2$, therefore has to deliver at least 5 μA/cm$^2$ or 50 mA/m$^2$ of zinc surface area. This is already a very high current load for a zinc anode, close to the diffusion limit.

After 75% consumption, the current load rises to 107 mA/m$^2$. As is known to the person skilled in the art, in the case of a current load of about 50-75 mA/m$^2$—according to concrete quality (porosity, degree of saturation, cement content)—the diffusion limit is attained, meaning that the zinc anode can deliver a maximum current of 50-75 mA/m$^2$. The galvanic zinc anode has already reached this diffusion limit and hence the theoretical capacity limit after 50% consumption. As a result of the deposition of zinc hydroxide as anodic degradation product, which hinders ion transport, the diffusion limit could be much lower still. As the person skilled in the art knows, "diffusion limit" means the restriction of the galvanic current by the rate at which ions diffuse out of the pore system of the concrete to the electrode surface or from the electrode surface into the pore system of the concrete. If the galvanic current exceeds this limit, there is a decrease in the concentration of the electrochemical active ions at the electrode surface and hence in the galvanic current. It is thus not possible for more current to flow between the electrodes than charges that are transported by the ions between the electrodes. The limiting diffusion current is therefore the theoretical maximum current that can be supplied by a galvanic anode, not taking account of other influencing parameters such as overvoltage, passivation resulting from overacidification at the anode surface, increase in the diffusion resistance and in the electrolytic resistance as a result of deposition of anodic products, for example zinc hydroxide etc.

In individual anodes which are inserted and/or embedded into concrete for prevention of "incipient anodes", the weight of the galvanic zinc anode is typically 100-200 g. Although it is possible by applying longitudinal grooves (for example of star-shaped cross section) or transverse grooves (sheets applied to a cylinder—inserted by machining or cast) to increase the initial surface area, the grooves have been used up after not more than about 50% consumption of the galvanic anode. In surface anodes, the weight of the zinc is typically 2-2.5 kg/m$^2$.

A galvanic individual anode containing, for example, a solid zinc cube (see FIG. 1a: edge length 3.48 cm, a=b), with a volume of 42 cm$^3$ and a weight of 300 g and a surface area of 72 cm$^2$ (weight, volume and surface area, corresponds roughly to the dimensions of the zinc cylinder from the example cited above), would attain the diffusion limit after not more than 50% consumption (after 50% consumption, 63% of the original surface area is still available). In the case of higher consumption, it would no longer be possible to assure reliable corrosion protection.

Figure 1:
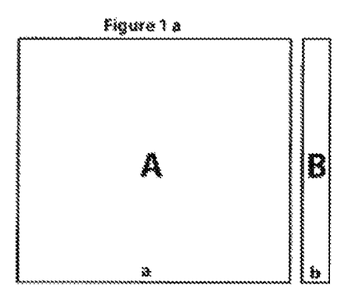

FIG. 1b shows the use of, for example, 3 equivalent zinc sheets rather than a zinc cube: the zinc sheets (c×d=1.16× 3.48 cm) with a total weight of 300 g are shown in C in a side view. The plates are electrically connected to one another by a zinc rod e and embedded in a suitable electrolytically conductive matrix F. The individual anode consisting of the zinc plates C and the connection e between them and the electrolytically conductive matrix F is embedded into concrete H close to the steel reinforcement G and electrically connected to the steel reinforcement.

Of the galvanically available total surface area (121 cm$^2$), only a maximum of half is galvanically active and the diffusion limit would likewise already be attained after 50% of the consumption of the galvanic anode and further corrosion protection of the steel reinforcement would no longer be assured. The surface area decreases continuously during operation; after 50% consumption it is still 70%, and after 75% consumption still 50% of the initial surface area.

This of course applies not only to rectangular sheets or plates but also to sheets or plates that are circular or of any desired shape.

If, rather than a cylinder, a cube or sheets, a zinc plate, for example a square zinc plate having an edge length of a=10 cm and a height of b=0.42 mm with a surface area of 100 cm$^2$ and a weight of 300 g of zinc with a volume of 42 cm$^3$, is used, the minimum current density required to maintain corrosion protection of the steel reinforcement is 6.2 µA/cm$^2$ or 62 mA/m$^2$. The surface area of the galvanic anode remains constant during the operation of the individual anode, but the current density is still within the range of diffusion control.

At the interface between a galvanic zinc anode and the pore liquid of the electrolytically conductive binder in which the galvanic anode is embedded, anodic products form: zinc is oxidized to zinc ions having a double positive charge, which go into solution, reacts with water to give zinc hydroxide and acid—protons. The zinc hydroxide is typically deposited at and close to the interface to the galvanic anode and can lead to an increase in electrolytic resistance. If the zinc ions form more quickly than they can diffuse away from the anode surface, a zinc hydroxide layer forms directly at the anode surface, which can significantly hinder ion diffusion. The acid formed with chloride ions, for example, combines to give hydrochloric acid. Zinc becomes passive in the neutral to weakly basic range through the formation of an impermeable zinc oxide layer. Zinc only becomes galvanically active in the strongly alkaline range, as described in the patents cited above (U.S. Pat. Nos. 6,022,469, 6,303,017, 6,193,857). If the formation of acid at the interface to the galvanic anode proceeds more quickly than further alkali ions (OH$^-$) are able to diffuse in from the pore space of the electrolytically conductive binder, the pH drops and the galvanic anode is passivated. This is particularly true of ion-conductive matrix. In the acidic range, particularly in the presence of chlorides, there is self-corrosion of the zinc with evolution of hydrogen—this corresponds to an internal short circuit of the zinc anode, which prevents the protective current from flowing to the reinforcement.

It is apparent from this that, in order to assure reliable corrosion protection of the steel reinforcement, it is necessary to limit the galvanic protective current which flows from the galvanic anode to the steel reinforcement per unit area, in such a way that the anodic processes do not lead to lowering of the pH and to mass formation of anodic products, for example zinc hydroxide. It has been found that this can be achieved when not more than 20% of the limiting diffusion current flows from the galvanic anode to the steel reinforcement—i.e. max. 1-1.4 µA/cm$^2$ or 10-15 mA/m$^2$ of galvanically active anode surface area.

The examples cited above show clearly that this aim can be achieved only to a limited degree, if at all, with the individual anodes used in practice.

The simplest solution would be to increase the galvanically active surface area of the galvanic anodes. For practical reasons, individual anodes have to remain of manageable size in order to be installed at the construction site or inserted into drilled holes. The increase in the surface area by profiling—for example longitudinal or transverse channels—does not bring any advantage in the medium to long term, as has been shown above.

The optimal solution would be a galvanic anode having a high surface area which does not decrease significantly during the operation of the galvanic anode.

An increase in the surface area can be achieved, for example, by the change in the structure of the galvanic anode, for example by machining holes into a metal plate or increasing the size of drilled holes by drawing the metal plate.

This is shown schematically by way of example in FIG. 1c in the form of a plate K into which four square holes having an edge length of k=4.66 cm have been machined. The thickness of the plate is m=0.70 cm, and the distance between the square holes is twice the thickness, namely 1.4 cm. The side lengths of the perforated plate is l=12.11 cm, and the volume 42 cm$^3$; if the perforated plate consisted of zinc, its weight would be 300 g.

The geometric surface area of the plate (which in this case is identical to the geometric total surface area) is 145 cm$^2$. The expected galvanically active surface area of the plate, i.e. the surface facing the steel reinforcement—without the reverse side and without the side faces—is 60 cm$^2$. The expected galvanically active surface area of the anode is less than the geometric surface area and is insufficient for reliable corrosion protection.

Experiments have now shown that, surprisingly, the side faces of the holes and of the plate are also galvanically active up to a certain thickness (m≤2k, preferably m≤2k, where m is the thickness and k is the hole cross section; see FIG. 1c). If this thickness (m in FIG. 1c) is not exceeded, given a sufficient hole cross section, the reverse side of the perforated plate is also galvanically active.

Thus, there is an increase in the galvanically active surface area of the galvanic anode to 207 cm$^2$. Assuming a radius of action of 20 cm, as described above, a minimum galvanic current required for reliable corrosion protection of the steel reinforcement of about 1.7 µA/cm$^2$ or 17 mA/m$^2$ is thus found. This value is still well above the value that should not be exceeded for optimal operation of an anode, but is already only 20-35% of the limiting diffusion current.

Figure 2:
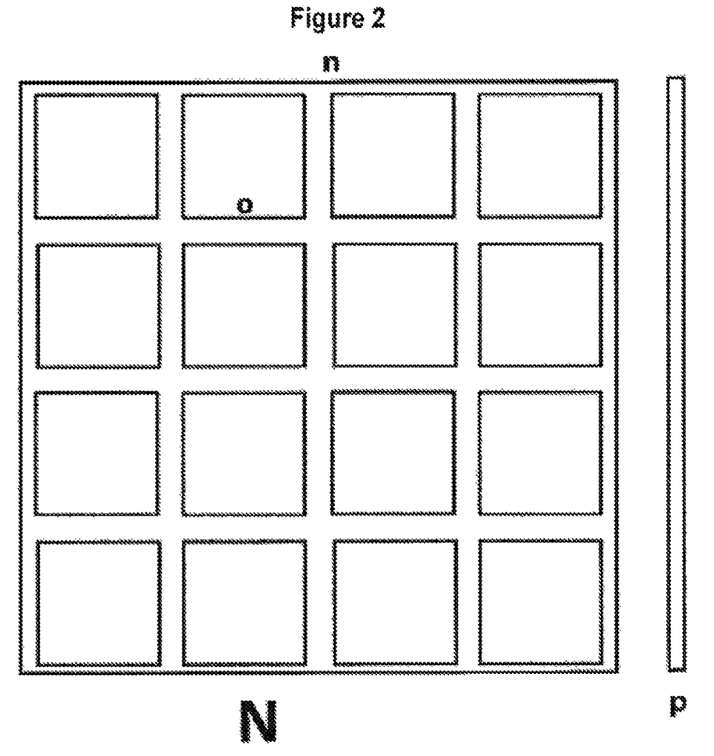

FIG. 2 shows a perforated plate N with four times the number of holes—16 per plate. Given a side length of n=11.42 cm, an edge length of the holes of o=1.79 cm and a plate thickness of p=0.53 cm, and given a volume of 42 cm$^3$ (corresponding to 300 g of zinc) and given a geometric surface area (which in this case is identical to the geometric total surface area) of 130 cm$^2$, a galvanically active surface area of 270 cm$^3$ is found—the holes are large enough and the plate is thin enough that the reverse side of the plate and all sides of the plate are also galvanically active and not just the side facing the steel reinforcement to be protected. Given a radius of action of 20 cm, this gives a minimum current density of 1.4 µA/cm$^2$ or 14 mA/m$^2$.

An equivalent perforated plate having the same weight and volume (42 cm$^3$), with a plate thickness of p=0.25 cm, with 100 holes/plate, an edge length of the holes of o=1.00 cm, given a geometric surface area of 266 cm$^2$, has an active galvanic surface area of 433 cm$^2$. Under the same assumption as above, the minimum galvanic current for reliable corrosion protection of the steel reinforcement is 0.87 µA/cm$^2$ or 8.7 mA/m$^2$. This value is within the range of the optimal operating conditions of galvanic anodes. The structural alteration of a galvanic plate, for example by introduction of holes, can achieve doubling of the galvanically active surface area. The effect of this is that the galvanic current/anode surface area are within a range in which optimal and reliable corrosion protection of the steel reinforcement is assured.

During the operation of the galvanic anode, however, as a result of the consumption of the anode material, there is a decrease not just in the volume but also in the surface area of the galvanic anode; thus, in the example cited above, after 50% of the consumption of anode material, assuming homogeneous consumption of the anode material on all sides, it decreases from 433 cm² to 326 cm², and after 75% consumption to 231 cm². Thus, the minimum galvanic currents after 50% of the consumption are 1.16 µA/cm² or 11.6 mA/m², and after 75% consumption 1.63 µA/cm² or 16 mA/m².

This would mean that the above-described anode reliably protects the steel reinforcement from corrosion up to at least 50% of its useful life; beyond that, the reliability decreases and, after 75% of the useful life, exceeds the reliable range—max. current density of 15 mA/m².

However, it has been found that, surprisingly, in the case of a galvanic zinc anode having the above-described dimensions, the actual galvanic consumption of the zinc does not proceed homogeneously on all sides; instead, the thickness of the zinc plate decreases about ⅓ more quickly than the distance between the holes. The effect of this is that the actual decrease in the active galvanic surface area of the zinc anode proceeds more slowly; after 50% consumption of the zinc anode, the galvanically active surface area was 362 cm², and after 75% consumption was still 276 cm², such that the minimum galvanic currents after 50% of the consumption at 10.4 µA/cm² or 10.4 mA/m², and after 75% consumption at 1.34 µA/cm² or 13 mA/m². These current densities are within the range of reliable corrosion protection of the steel reinforcement.

These restrictions apply essentially to prefabricated individual anodes which, for example, are embedded into the concrete, inserted into drilled holes or placed onto the concrete surface. For practical and technical reasons, the individual anodes should be provided with manageable dimensions—circumference, edge length, diameter—and to assure adequate and reliable protection of the steel reinforcement within a radius of action of 20 cm, which covers an area of 1250 cm². The corrosion protection of the individual anode in the example cited acts over several times the geometric surface area of the individual anode. Corrosion protection of the reinforcement steel is understood to mean active corrosion protection of the steel and/or preventive corrosion protection. Active corrosion protection protects already corroding steel; preventive corrosion protection protects steel which is potentially at risk of corrosion but has not yet been subject to active corrosion. Preventive corrosion protection is highly advantageous particularly for prevention of "incipient anodes", for the prolonging of the useful life of steel-reinforced concrete structures.

However, these restrictions apply to a much smaller degree to surface anodes which are applied to the concrete surface and protect the steel reinforcement directly beneath the galvanic anode. The area of protection of surface anodes, according to the size of the surface anode, is virtually identical to the geometric surface area thereof. Surface anodes are active in the edge regions up to about 10 cm beyond their actual geometric surface area. Typically, surface anodes, if possible, are installed such that they cover the entire area to be protected. By contrast, the area of action of individual anodes is almost always greater than the geometric surface area thereof. In the case of surface anodes which cover, for example, 100 m² of concrete surface area, the area of action is virtually identical to the geometric surface area. Small surface anodes which cover an area of <1 m² can also be regarded as individual anodes.

The effect of the increase in the galvanically active surface area by inventive structural alterations to the galvanic anode such that the galvanically active surface area of the galvanic anode is greater than the geometric surface area is that a galvanic anode of the invention, also referred to hereinafter as "perforated anode", used as an individual anode, is able to reliably protect the steel reinforcement within a radius corresponding to at least twice the diameter of the individual anode over at least 75% of the useful life of the galvanic anode.

The galvanic anode of the invention need not necessarily of a perforated plate or perforated sheet, but may also consist, for example, of a grid, mesh or arrangement of wires and rods with which the effect of the invention can be achieved. The holes need not necessarily be square, but may also have any desired polygonal to round and elliptical forms. What is essential is that the diameter of the holes is large enough that the electrical field can also form over the area of the reverse side of the galvanic anode of the invention. For this purpose, the smallest hole diameter should be at least 50%, preferably at least 100% and more preferably at least 200% of the height of the galvanic anode plate or grid.

The examples show that the radius of action of an individual anode embedded in the concrete is up to 20 cm and hence a multiple of the volume of the individual anode. In the course of operation of the galvanic anode, during which the galvanic anode is consumed, the galvanically active surface area of the anode decreases, specifically by about 15-25% after 50% consumption and by about 30-40% after 75% consumption, according to the geometry of the anode of the invention.

Since a galvanic anode should reliably protect the steel reinforcement from corrosion at least up to 75% consumption of the anode, assuming an area of action having a radius of 20 cm, operation toward the end of the useful life is at the margins of reliability. Moreover, the protective action of the anode decreases proportionally to the loss of surface area. This means that the area of action, for reliable corrosion protection, has to be designed on the basis of the galvanically active surface area available after 75% consumption of the galvanic anode.

A galvanic anode, particularly an individual anode, the galvanically active surface area of which decreases only insignificantly, if at all, during utilization thereof, would be highly advantageous with regard to reliability and with regard to its radius of action. A higher radius of action brings about a significant cost saving: a 40% larger radius of action brings about a cost saving for the corrosion protection of the reinforcement steel of almost 50%; only half the individual anodes are required in order to protect the steel reinforcement in the same area of action.

Figure 3:
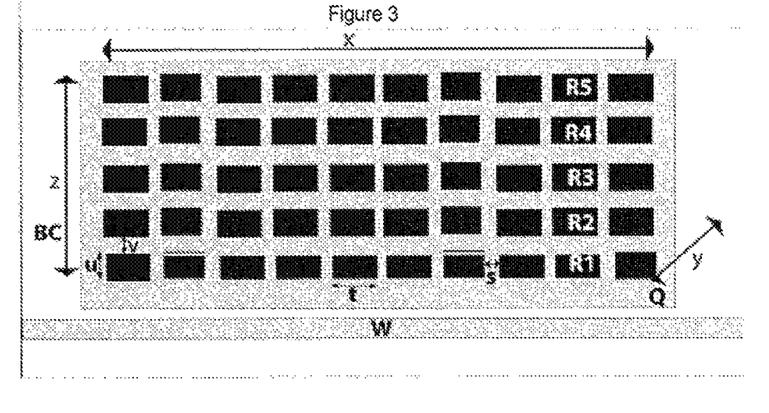

FIG. 3 shows a galvanic anode consisting of inventive galvanic sub-anodes Rx (R1, R2, R3, . . . ) stacked one on top of another, for example strips of a perforated plate, perforated film, grid or mesh, consisting of a galvanically active metal, preferably zinc. The stacked sub-anodes are embedded in an electrolytically conductive matrix Q and, connected electrically to one another, form a "stacked anode" of the invention, from which, embedded in concrete X, a galvanic current flows to the reinforcement steel W, which is protected from corrosion given sufficient current density.

It has been found that, surprisingly, given suitable choice of the hole size s, the thickness u of the perforated plate and the distance of the perforated plates from one another (e.g. perforated plate R2 from perforated plate R1), the galvanically active surface area of the galvanic anode surprisingly remains virtually constant over more than 75% of the useful life of the galvanic anode.

It has additionally been found that, through suitable choice of the hole size s, the thickness u of the perforated plate and the distance v of the perforated plates from one another, it was surprisingly possible to control the size of the galvanically active surface area:

Given a sufficiently small hole diameter s, but one which is large enough for the reverse side of the perforated plate to be galvanically active, and a sufficiently great distance v of the perforated plates from one another, at the start of operation of the galvanic anode, only the sub-anode R1 is galvanically active. At the start, only the anode material of the inventive "perforated anode" R1 is consumed, as already described above. As a result of the consumption, there is a decrease in the thickness u and, to a lesser degree, the distance t between the holes. As a result, there is a continuous increase in the diameter s of the holes. As a result of the increase in the hole diameter s and the associated increase in the hole size, the electrical field can spread further in the ion-conducting matrix Q. Once the electrical field reaches the galvanic sub-anode R2, the latter and hence also the surface of R2 is "activated". With increasing enlargement of the holes of the sub-anode R1, there is thus an increase in the active portion of the surface of the galvanically active anode R2. Once the sub-anode R1 has been consumed, the sub-anode R2 takes over the role of the sub-anode R1 and, given a sufficient increase in the hole size of R2, the sub-anode R3 is activated. Thus, the activation of the sub-anodes is continued without any significant change in the galvanically active surface area of the overall anode.

Given suitable choice of the parameters—hole size s, the thickness u of the perforated plate, the distance v of the perforated plates from one another and the electrolytic conductivity of the ion-conducting matrix Q—it is thus possible to achieve the effect that the galvanically active surface area of the stacked anode, according to the number of sub-anodes of the stacked anodes of the invention and setting of the parameters mentioned, remains virtually constant over an area of more than >75%.

The spread of the electrical field between the reinforcement steel to be protected and the galvanic sub-anodes is effected by the parameters mentioned as follows:
 enlargement of the range of the electrical field by:
  enlargement of the hole diameter s/cross-sectional hole area
  reduction in the plate/sheet/wire thickness u
  increase in the electrolytic conductivity of the ion-conducting matrix Q.

The range of the electrical field determines when the sub-anodes of the stacked anode of the invention further removed from the steel reinforcement to be protected are galvanically activated. The time when or the consumption of the respective galvanic sub-anode (Rx) at which the next furthest removed sub-anode (Rx+1) is galvanically activated does of course also depend on the distance v between the sub-anodes; the smaller the distance, the sooner the further removed sub-anode is activated and vice versa.

With a given structure of the stacked anode, it is thus the hole size, analogously to an aperture of a camera, that determines the range of the electrical field and hence when the subsequent sub-anodes are galvanically activated.

Given a sufficiently large "aperture", the subsequent sub-anode and possibly even the second subsequent sub-anode are activated from the start. Such a structured sub-anode features a high galvanically active surface area—in this way, the galvanically active surface area can be multiplied compared to the geometric surface area. According to the invention, the number of galvanically active sub-anodes can be controlled either via the size of the "aperture" or via the distance between the sub-anodes, in a mutually independent or simultaneous manner.

This brings advantages especially in the case of production of particularly small individual anodes having high galvanic range, and also advantages for use in highly chloride-contaminated concrete components in which the corrosion protection of the steel reinforcement requires high galvanic currents.

The "perforated anode" of the invention, which is characterized in that the galvanically active surface area thereof is greater than, preferably at least twice as high as, the geometric surface area thereof, need not necessarily consist of a plate or sheet provided with holes or of a mesh or grid, but may also be produced by suitable arrangement of wires and rods of a suitable galvanically active metal.

The stacked anode of the invention, which is characterized in that the galvanically active surface area decreases only slightly, if at all, during galvanic operation, preferably up to at least 50% of the consumption of the galvanic anode, especially up to at least 75% of the consumption of the galvanic anode, need not necessarily consist of a stacked arrangement as shown in FIG. 3. It may also consist of a three-dimensional network of wires, rods, grids, meshes, for example folded grids.

A preferred production of a three-dimensional galvanic anode network consists of a "metal sponge" filled with ion-conductive matrix. Such a metal sponge, consisting of zinc, can be produced by adding a soluble heat-resistant salt to the zinc melt for vice versa, said salt being leached out after the melt has cooled down. Using the grain size of the water-soluble salt, e.g. sodium chloride, it is possible to control the pore size of the sponge. This is highly important for the mode of function, especially for the lasting galvanic activity of the "metal sponge anode": as already described, degradation products form during the galvanic function; zinc and its alloys form zinc hydroxide ($Zn(OH)_2$), which takes up a volume 2.3 times greater than the zinc metal. The galvanically formed zinc hydroxide therefore fills the internal pore volume. In the presence of chloride, it is also possible for water-insoluble zinc hydroxo chloride to form, which acts like a cement. When the pore volume is too small, the galvanically formed products "block" the pores and prevent ion transport—the ion conductivity decreases until ion conductivity is lost. Since, in a sponge, by contrast with the "stacked anode", no fillable volume is available between the individual grid laminas, the pore volume of the sponge therefore has to be large enough to be able to accommodate the galvanically formed degradation products. It has been found that this can be achieved when the galvanically active surface area is at least 4 times, preferably 6 times, as high as the geometric surface area—outer surface area—of the sponge.

The galvanic anode of the invention consists of the metal sponge, a suitable ion-conductive matrix that fills the pores and interstices in the sponge and surrounds the sponge, and suitable electrical contacts, for example galvanized iron wires, for the electrical connection to the reinforcement steel to be protected. The metal sponge anode of the invention can be "filled" with an ion-conductive matrix, for example, by immersion under reduced pressure into a liquid binder, which then hardens or gelates around the sponge. The ion-conducting matrix should preferably be able to accommodate galvanic degradation products in terms of volume, for example in that a solid ion-conducting matrix has a sufficient pore volume—preferably >20% by volume.

The various structural variants of the "galvanic stacked anode" of the invention can also be encompassed by the collective term "galvanic 3D anode".

The following definitions are compiled for the understanding of the mode of function of the "galvanic 3D anodes" of the invention and the "perforated anodes":

Galvanically active surface area (GAO): the galvanically active surface area is the portion of the galvanic 3D anode and/or perforated anode of the invention from which galvanic current flows to the reinforcement steel and galvanically active metal, zinc in the case of a galvanic zinc anode, is degraded and converted to anodic products, e.g. zinc hydroxide. One process, the flow of current, causes the other process, degradation, and vice versa.

According to the invention, the galvanically active surface area of the metal anode is at least 1.3 times as high as the geometric surface area (GO) thereof, optionally 1.4 times, preferably 1.7 times as high, and especially twice as high.

Galvanically available surface area (GVO): the galvanically available surface area is the surface area of the anode of the invention which is available overall for the galvanic protection of the steel reinforcement. By definition, the galvanically available surface area is ≥the galvanically active surface area.

According to the invention, the galvanically available surface area of the metal anode is at least 1.3 times as high as the geometric surface area (GGO) thereof, optionally 1.7 times, preferably twice as high, especially 3 times as high.

Geometric total surface area (GGO): the geometric total surface area is the surface area covering the galvanically available portion of the galvanic anode. For example, in the case of the perforated anode of the invention shown in FIGS. 1a, 1b and 1c, this is the surface area of the square prism $2a^2+4a*b$, $2l^2+4l*m$, $2n^2+4n*m$. In the case of a sheet anode (FIG. 1b), at a plate separation of, for example, 0.5 cm, this is the surface area that covers the prism $(3c+2*0.5)*d=55$ cm$^2$.

In the case of a stacked anode as shown in FIG. 3, the geometric total surface area (GGO) is: $((n-1)*t+(n*s)^2*N*2+((m*u+(m-1)v)*((n-1)*t+n*s))*2$, where n=number of holes with diameter s in the longitudinal direction, N=ratio of length/width of the galvanic anode $(((n-1)*t+n*s)/z)$, m=number of stacked anodes at distance u. The GGO can also be calculated according to FIG. 3 with the simplified formula $2*x*y+2*z*y+2*x*z$.

Total volume (GV)/total weight (GG): is the volume/weight of the galvanically available metal of the galvanic metal anode. The GG is calculated from the specific weight ρ of the galvanic metal, e.g. zinc 7.15 g/cm$^3$: $GG=\rho*GV$.

Geometric surface area (GO): the geometric surface area is the surface area covering the galvanically active portion of the galvanic anode. For example, in the case of the perforated anode of the invention shown in FIGS. 1a, 1b and 1c, this area is identical to the geometric total surface area: $GO=2*l^2+4*l*m$. In the case of the stacked anode of the invention, the following applies to the geometric surface area if only one sub-anode (e.g. R1) is galvanically active according to FIG. 3: $GO=((n-1)*t+n*s)^2*N*2+((m*u+(m-1)v)*(n*t+(n-1)*s))*2$ with m=1. Or in simplified form, GO according to FIG. 3: $GO=2*x*y+2*u*x+2*u*y$.

Galvanically active volume (GAV)/weight (GAG) of the galvanic anode of the invention: weight=volume×spec. weight of the galvanic metal (zinc 7.15 g/cm$^3$), defines the total metal available for the galvanic corrosion protection. With knowledge of the galvanic current flow and the proportion of auto-corrosion, it is possible according to the Faraday equation to calculate or at least estimate the useful life of the galvanic anode.

Geometric total volume (GGV): the geometric total volume is the volume covered by the geometric total surface area.

Geometric volume (GeV): the geometric volume is the volume covered by the geometric surface area.

For example, for a stacked anode (FIG. 3) consisting of 8 laminas of a square perforated anode of the invention, having 100 meshes/holes and the following dimensions: sub-anode: s=0.60 cm, wire thickness u=0.12 cm, t=0.30, distance v between the sub-anodes 0.2 cm; the mesh size was chosen such that 2 sub-anodes in each case are galvanically active, with the following values for the terms defined above:

(1) galvanically active surface area (GAO)=galvanically active surface area of two sub-anodes=234 cm$^2$
(2) galvanically available surface area (GVO)=8× GAO=8×117=937 cm$^2$
(3) geometric total surface area (GGO) with v=0.2 cm, x=y=8.34 cm, z=2.35 cm: $GGO=2*x^2+4*x*z=218$ cm$^2$
(4) geometric surface area (GO)=GO of two sub-anodes=144 cm$^2$
(5) total volume (GV)/weight (GG): 8*5.25 cm$^3$=42 cm$^3$, 42 cm$^3$*7.15 g/cm$^3$=300 g
(6) geometric total volume (GGV): 164 cm$^3$
(7) geometric volume (GeV): 8.28 cm$^3$
(8) galvanically active volume (GAV): 10.5 cm$^3$
(9) galvanically active weight (GAG): 75 g This means that the stacked anode of the invention cited above as an example has a ratio of the GVO/GGO=4.30 and a ratio of GAO/GO=1.63. The galvanically available surface area—the potentially active internal surface area of the stacked anode of the invention—is thus 4.3 times as high as the GGO. The galvanically active surface area of 234 cm$^2$ is sufficiently high to assure reliable corrosion protection of the steel reinforcement.

The ratio of the total volume (GV) to the galvanically active volume GV/GAV=4.00, meaning that the galvanically active surface area does not decrease up to at least 75% of the useful life of the galvanic anode and hence reliable corrosion protection is assured up to at least 75% of the useful life. Since the current required for the corrosion protection of the steel reinforcement, as the person skilled in the art is aware, decreases during operation because of passivation effects and because of the migration of the chloride ions from the steel surface in the direction of the anode and because of the associated chloride loss, corrosion protection is assured until the end of the useful life. With a current flow of 3 mA/m$^2$ of steel reinforcement, a radius of action of 20 cm and a reinforcement density/concrete surface area of 1, a current flow of 0.38 mA is found. This current flow is used to calculate a maximum useful life of 74 years and, in the case of a very conservative worst-case assumption of a current requirement of max. 10 mA/m$^2$ of steel reinforcement, a minimum useful life of 22 years. A realistic assumption is a real useful life of about 50% of the maximum useful life—about 37 years.

A further advantage of the "galvanic perforated anode" of the invention, especially of the "galvanic 3D anode" of the invention, is that the anodic degradation products of the galvanic anode, e.g. zinc hydroxide, are distributed and hence effectively diluted over a large volume of the ion-conducting matrix, in such a way that the formation and deposition thereof does not have any noticeable adverse effect on the function of the galvanic anode.

The ratio of the volume of the ion-conducting matrix/total volume 132/42=3.9 in the example cited above means that the volume of the ion-conducting matrix is nearly 4 times as high as the volume of the galvanic zinc. In the pore spaces of the ion-conducting matrix, there is thus a sufficient space for anodically formed products, e.g. zinc hydroxide.

In conventional individual anodes, the mass formation and deposition of anodic products at or close to the anode surface can lead to an increase in the electrolytic resistance of the ion-conducting matrix. The increase in the electrolytic resistance of the ion-conducting matrix can greatly impair the ability of the anode to function, and can lead to failure of the galvanic anode after only 25-50% of useful life.

The anodes of the invention, the "galvanic perforated anode" of the invention and the "galvanic stacked or 3D anode" of the invention are produced by proper embedding of the galvanic metal anode structured in accordance with the invention into a suitable ion-conducting matrix. One method among several methods is embedding into a liquid binder which cures after a rest period, as described in EP 2313352 B1 and in U.S. Pat. No. 8,394,193. However, it is also possible to use a material that forms an elastic or gel-type matrix. Preferably, the ion-conducting matrix should prevent passivation of the galvanic metal anode and/or assure adequate galvanic activity of the galvanic metal anode.

However, the ion-conducting matrix should also prevent self-corrosion of the galvanic anode; the pH of the ion-conducting matrix should therefore not be less than pH 7, preferably greater than pH 8. Very good results are obtained with an ion-conducting matrix according to EP 2313352 B1, having a pH>9.

The area of action of individual anodes which are inserted and/or embedded into the concrete is greater by definition than the cross section or geometric surface area thereof. The area of action of individual anodes mounted on the concrete surface is typically not significantly greater than the geometric surface area thereof that faces the concrete surface. In the case of galvanic zinc foils bonded flat on the concrete surface, the area of action is virtually identical to the geometric surface area of the galvanic anode.

An inventive variation of the "stacked anode" of the invention is the embedding of at least two laminas of "perforated anodes" of the invention into the binder of the invention. In this way, it is ensured that the galvanically active surface area remains virtually constant up to at least 50% useful life and, moreover, that the galvanically available surface area is at least doubled. According to the invention, this second lamina is preferably applied in regions in which high galvanic currents, for example as a result of high chloride contamination and/or a high moisture content of the concrete, are expected.

In this way, it is possible not just to increase the galvanically active surface area but also to multiply the useful life without any great difficulty and without relative extra costs.

It is a feature of conventional galvanic surface anodes, for example based on zinc foils which are applied to the concrete surface, that the zinc foil is degraded very much more quickly in the regions of high galvanic currents which flow particularly in regions of high corrosion risk as a result of high chloride contamination and/or high moisture content, and holes arise in the film specifically at those points and hence there is no longer any corrosion protection in this region.

The surface anode structured as described above in accordance with the invention also remains active without reduction in these regions of high corrosion risk.

EXAMPLE 1

An anode of the invention was produced as follows:
Strips of width 3 cm and length 10 cm were cut out of a zinc grid (zinc content >99.2% by weight) with an inner mesh size (s) of 5 mm (see s in FIG. 3), a land width (t) of 2.6 mm (see t in FIG. 3) and a thickness (u) (wire thickness) of 1.2 mm (see u in FIG. 3). Each zinc grid strip has a geometric total surface area of 30 cm$^2$ and a galvanically available surface area of 50 cm$^2$ and a weight of 13 g.

Eight zinc grids of this kind were placed one on top of another to give a stack, such that the grid holes lay one on top of another and formed a continuous cylindrical orifice. A galvanized steel wire (wire thickness 1 mm) was conducted through the cylindrical orifice at one end, laid diagonally along the underside of the anode to the other end of the anode and thence conducted back through the cylindrical orifice in the upward direction, such that the wire projected out by about 30 cm at either end—the wire serves as connecting wire for the electrical connection of the galvanic anode of the invention to the reinforcement steel to be protected. The individual grid strips and the galvanized wire were bonded to one another with a tin-zinc solder.

The height of the stacked anode was 18 mm, such that the mean distance (v) (see v in FIG. 3) between the zinc grid strips was about 1 mm.

The geometric total surface area of the galvanic stacked anode was 106 cm$^2$; the galvanically available surface area was 403 cm$^2$; the galvanically active surface area was 101 cm$^2$. The weight of the stacked anode was 100 g.

The galvanic stacked anode was embedded into an ion-conducting matrix of the invention as follows:

250 g of a binder as described in EP 2313352 B1 were prepared: 100 g of component A, 50 g of component B and 130 g of filler (inert marble sand 0.2-0.5 mm) were mixed with one another.

250 g of binder were introduced into a mold having the internal dimensions L=12 cm, B=4.5 cm, H=3.5 cm. The mold filled with the binder was placed onto a vibrating table, and the stacked anode was placed onto the binder and embedded fully with vibration, in such a way that the sides and edges of the stacked anode were at least 5 mm away from the walls of the mold. After the binder had cured completely (2 weeks at 35° C.), the galvanic anode was ready for operation.

The galvanic anode of the invention was placed onto a reinforcement steel grid (8 steel rods, Ø 10 mm, length 10 cm, bonded to one another by a welded-on 8 mm steel rod) in a plastic vessel (3 L). The reinforcement steel grid rested on an aquarium ventilation plate. The galvanic anode of the invention was electrically connected to the reinforcement steel grid via a shunt resistance of 1 ohm. The bucket was filled with about 2 liters of 3% sodium chloride solution, such that the entire arrangement was covered with at least 1 cm of salt solution. After the ventilation had been switched on, the galvanic current was measured by on-line recording of the voltage drop across the shunt resistance.

The following current values over time (after the electrical anode-cathode connection) were registered:

| Time | Galvanic current |
|---|---|
| 1 hour | 20 mA |
| 1 day | 14 mA |
| 7 days | 8 mA |
| 14 days | 5 mA |

-continued

| Time | Galvanic current |
|---|---|
| 28 days | 3 mA |
| 3 months | 2.5 mA |
| 6 months | 2.3 mA |
| 12 months | 2.4 mA |
| 2 years | 2.2 mA |
| 3 years | 2.1 mA |
| 5 years | 1.5 mA |

The results show that, immediately after switch-on, a high switch-on current flows (14-20 mA), which stabilizes after about 1-3 months at 2.5-3 mA. Until about ¾ of the useful life of the galvanic anode, the galvanic current remains virtually constant; after the consumption of about ¾ of the zinc (after about 4.2 years), the galvanic current flow decreases.

EXAMPLE 2

A galvanic anode which was produced as described in example 1 was used in a concrete repair of a chloride-contaminated (up to 3.5% by weight of chloride/cement weight of the concrete) bridge longitudinal beam:

The bridge longitudinal beam had, at a point close to the longitudinal beam head, visible damage—flaking concrete, cracks, rust stains. The concrete was removed from the damaged site by high-pressure water jetting over an area of about 1×2 m down to beyond the steel reinforcement. At the edges of the repair site toward the old concrete, by means of the galvanic wire which was wound around the respective reinforcement steel, a total of 12 anodes of the invention were secured to the reinforcement steel and embedded in repair mortar. The repair mortar contained max. 1% polymer dispersion and was specified with conductivity of 18 kohm·cm.

3 randomly selected anodes were connected to the steel reinforcement via a shunt resistance of 1 ohm, such that the voltage drop across the shunt resistance was measurable on-line: two 3.5 mm² copper braids were soldered on upstream and downstream of the shunt resistor and the braids were connected to a current/voltage converter at a distance of about 1 m. The converter was connected via an analog/digital converter unit to a digital data recording system.

The galvanic currents measured were in the range of 0.7-0.9 mA/anode over an observation period of 5 years. This gives a current flow of 4.2-5.4 mA/m² of reinforcement steel surface area. These data can be used to estimate a useful life of about 15-20 years. The reinforcement steel was polarized up to max. −0.665 mV, such that there was no risk of hydrogen embrittlement of the steel. There was no observation of "incipient anodes"—new corrosion sites in the edge region of the repair site—even after 5 years. Potential field measurements of the reinforcement steel did not give any hint of a corrosion risk.

The invention claimed is:

1. A galvanic anode system for corrosion protection of steel in concrete, the galvanic anode system comprising a galvanic stacked anode embedded into an ion-conductive matrix, wherein:
   the galvanic stacked anode is composed of layered galvanic sub-anodes comprising holes, the sub-anodes each being selected from perforated plate, perforated sheet, grid and mesh, composed of zinc or an alloy thereof,
   the thickness of each of the sub-anodes is ≤twice the hole diameter of the holes in the respective sub-anode, and as a result of the thickness of the sub-anodes, the hole diameter of the holes in the sub-anodes, and a distance between each of the sub-anodes, the sub-anodes are galvanically activated one after the other during operation of the galvanic anode system, and
   the geometric total volume of the stacked anode is at least 2.3 times as high as the volume of the zinc or alloy thereof, such that the galvanically available surface area of the galvanic stacked anode is greater than its geometric total surface area.

2. The galvanic anode system for corrosion protection of steel in concrete as claimed in claim 1, wherein the galvanically available surface area of the galvanic stacked anode is greater than the galvanically active surface area of the galvanic stacked anode.

3. The galvanic anode system for corrosion protection of steel in concrete as claimed in claim 2, wherein the galvanically active surface area of the galvanic stacked anode does not decrease significantly.

4. The galvanic anode system for corrosion protection of steel in concrete as claimed in claim 1, wherein the galvanically available surface area of the galvanic stacked anode is at least 1.7 times as high as its total surface area.

5. The galvanic anode system for corrosion protection of steel in concrete as claimed in claim 1, wherein the diameter of the holes in each sub-anode is greater than the distance between the holes.

6. The galvanic anode system for corrosion protection of steel in concrete as claimed in claim 1, wherein the ion-conductive matrix hardens.

7. The galvanic anode system for corrosion protection of steel in concrete as claimed in claim 1, wherein the ion-conductive matrix has a pH of ≥7.

8. The galvanic anode system for corrosion protection of steel in concrete as claimed in claim 1, wherein the ion-conductive matrix surrounds the galvanic stacked anode on all sides.

9. The galvanic anode system for corrosion protection of steel in concrete as claimed in claim 1, wherein the volume of the ion-conductive matrix is greater than the galvanically available volume of the galvanic stacked anode.

10. The galvanic anode system for corrosion protection of steel in concrete as claimed in claim 1, wherein the volume of the ion-conductive matrix is 1.5 times as high as the galvanically available volume of the galvanic stacked anode.

11. The galvanic anode system for corrosion protection of steel in concrete as claimed in claim 1, wherein the hole diameters in the galvanic sub-anodes and the thickness of the sub-anodes are chosen such that the galvanic stacked anode can be galvanically active on all sides.

12. A process for producing a galvanic anode system as claimed in claim 1, comprising embedding the galvanic anode material into the ion-conductive matrix.

13. The process as claimed in claim 12, wherein the galvanic anode system is prefabricated.

14. The process as claimed in claim 13, wherein the prefabricated galvanic anode system is bonded onto the concrete and/or embedded into the concrete.

* * * * *